UNITED STATES PATENT OFFICE.

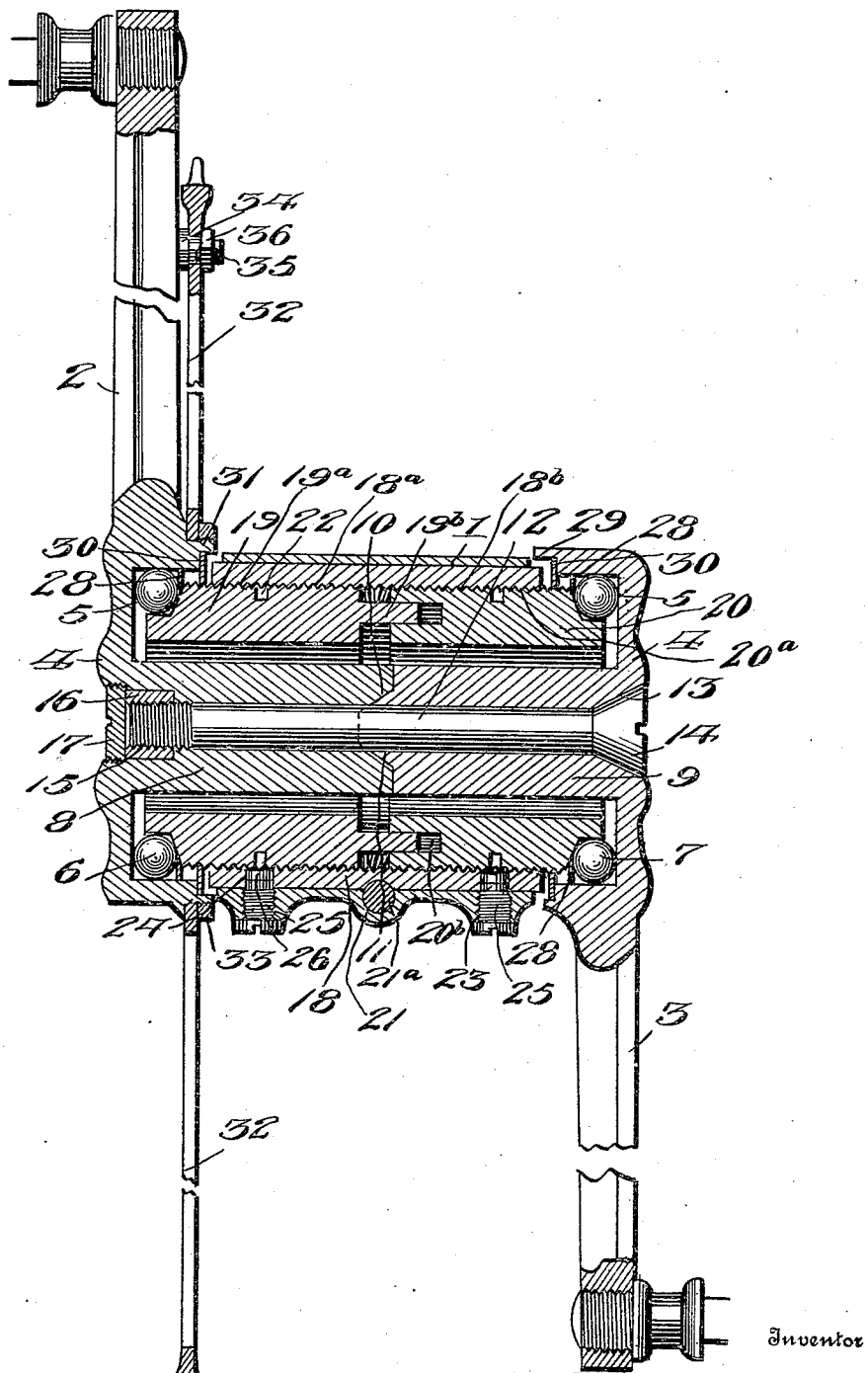
W. L. LOWRANCE.
CRANK SHAFT AND CRANK SHAFT BEARING FOR BICYCLES.
APPLICATION FILED FEB. 13, 1906. RENEWED APR. 29, 1907.
951,137.
Patented Mar. 8, 1910.

WILLIAM L. LOWRANCE, OF LEWISBURG, TENNESSEE, ASSIGNOR TO THE MIAMI CYCLE AND MFG. CO., OF MIDDLETOWN, OHIO, A CORPORATION OF OHIO.

CRANK-SHAFT AND CRANK-SHAFT BEARING FOR BICYCLES.

951,137. Specification of Letters Patent. Patented Mar. 8, 1910.

Application filed February 13, 1906, Serial No. 300,906. Renewed April 29, 1907. Serial No. 370,838.

*To all whom it may concern:*

Be it known that I, WILLIAM L. LOWRANCE, a citizen of the United States of America, residing at Lewisburg, in the county of Marshall and State of Tennessee, have invented new and useful Improvements in Crank-Shafts and Crank-Shaft Bearings for Bicycles, of which the following is a specification.

This invention relates to a crank shaft and crank shaft bearing for bicycles.

One object of my invention is to provide an improved crank shaft bearing whereby the bearings are brought into the plane of the cranks and at a greater distance than usual from each other and from the crank shaft center, and wherein the sprocket wheel is disposed inside the plane of one of the sets of balls, thereby reducing the friction and strain upon the parts, and also eliminating all side pull.

Another object is to provide an improved sectional construction of crank shaft and means for connecting the parts thereof to detachably connect the cranks, and also to provide a construction wherein the ball cups are carried by the cranks and rotate therewith and coöperate with relatively stationary cones carried by the hanger to form ball raceways, said cones being adjustable to maintain proper contact with the balls.

A still further object is to provide simple and effective means for adjusting the cones, and other improved features of construction whereby the general efficiency of the parts are increased and provision made to permit ready disassemblage of the elements for cleaning and repairs, and to exclude dust and other foreign substances from the bearings.

The figure of the drawing represents a central vertical section through a crank hanger, crank shaft and associated parts embodying the improved features of my invention.

The numeral 1 in the drawing designates the crank hanger, which is generally of ordinary construction, and 2 and 3, respectively, designate the cranks, each of which is provided with an integral hub portion 4 of substantially circular form, each of said hub portions being of somewhat less diameter than the hanger and recessed upon the inner face thereof to form a ball cup 5, said cups receiving the two sets of bearing balls 6 and 7. The hub portions 4 are respectively formed with crank shaft sections 8 and 9 which are integral therewith and project inwardly therefrom, one of said sections being formed at its inner end with clutch recesses 10 to receive clutch projections 11 upon the other section, whereby they are adapted to interlock when the parts are assembled to prevent independent movement thereof and cause the cranks to rotate in unison. The crank shaft sections are longitudinally bored for the passage of a securing bolt 12, the outer end of the bore of one section extending through the hub and being enlarged to form a recess 13 in which the head 14 of the bolt is countersunk, while the outer end of the bore of the other section is formed with a recess 15 to receive a securing nut 16 engaging the threaded end of the bolt, the outer end of said recess being internally threaded to receive a lock nut 17 which covers the nut 16 and prevents casual disconnection thereof. It will be seen that this construction of the shaft and fastening connection will securely hold the parts assembled and yet permit of their ready disconnection for cleaning or repairs.

Arranged within the hanger 1 is a holding sleeve 18 having right and left internal threads $18^a$ and $18^b$ on opposite sides of its transverse center, and in which are disposed relatively stationary bearing rings or members 19 and 20, the member 19 being formed with right hand external threads $19^a$ and the member 20 with left hand external threads $20^a$ to respectively engage the said threaded portions $18^a$ and $18^b$, whereby said members may be adjusted inwardly and outwardly longitudinally of the sleeve. Any other mode of connecting these parts to secure the desired adjustment may be employed. The said bearing members 19 and 20 are annular in form and loosely surround the crank shaft, being spaced therefrom so that the shaft will not contact therewith as it rotates. The outer ends of the bearing members are recessed and beveled to form cones for the sets of balls 6 and 7, while the member 19 is formed at its inner end with a reduced tongue or extension $19^b$ to slidably fit within a receiving socket or recess $20^b$ formed in the inner end of the member 20, thus permitting them to be independently adjusted while maintaining a proper staying and strengthening connection between them. The sleeve 18 is formed with a transverse groove 21 to receive a bolt or key 21ª passing through a lug formed on the bottom of the hanger, whereby said sleeve is locked from movement and yet may be removed from the hanger upon withdrawing the bolt. It will be apparent that the sleeve materially strengthens the hanger and may be applied and detached with the cones, thus allowing the latter to be simultaneously inserted in the hanger and removed therefrom, without disturbing their adjustment. The use of the sleeve also permits of the cones being adjusted therein for use before their application to the hanger. Each cone or bearing member is formed in the periphery thereof with an annular series of recesses or seats 22. One of the seats in each cone registers with coinciding openings 23 and 24 formed in the bottom portions of the hanger and sleeve, the openings 23 and 24 being screw threaded to receive a screw 25. The screw 25 closes said openings against access of dust and dirt and its shank is formed with an unthreaded or smooth-surfaced inner end bearing against a brass or other soft metal disk 26 forced by the screw against the threaded surface of the adjacent cone to lock the same against movement in either direction. Each cone, after adjustment, will thereby be held securely in adjusted position, and, as the disk is made of soft metal, the threads of the cone will not be mutilated. In order to adjust either cone, the screw and coöperating disk are removed, and then a suitable pin is inserted into the registering openings 23 and 24 and coinciding seat 22 and pressure exerted thereon to turn the cone in the desired direction, the openings 23 and 24 being large enough to permit of any slight adjustment which may be necessary to compensate for wear of the bearing parts.

The cone-surfaced ends of the bearing members 19 and 20 project beyond the ends of the hanger, and as the bearing balls 6 and 7 are disposed within cups 5 carried by the cranks and rotate upon said cone surfaces, it will be seen that the bearings are disposed at a greater distance than usual from each other and from the crank shaft center, while the cranks are arranged in the plane of the bearings, thus resulting in a reduction of friction and increased strength and durability of the parts as well as in the direct transmission of the crank strain to the bearing points. The balls 6 and 7 are maintained in proper position to engage the bearing surfaces of the cups and cones by retaining rings or washers 28 disposed between the surrounding portions of the cup walls and the outer ends of the bearing members 19 and 20 just inside of their cone surfaces. The cups are formed with recesses 29 to receive washers 30 formed of felt or other suitable material, which washers encompass the projecting ends of the bearing members 19 and 20 and close the joints between the same and the cups, thus preventing the access of dust and other foreign substances thereto.

The sprocket wheel is formed partly by the hub of the crank 2, which hub is provided with an inwardly extending flange 31 to receive the sprocket toothed rim 32 and is externally threaded to receive a threaded ring or nut 33 which clamps said rim in position. The crank 2 is formed with a shouldered lug or projection 34 having a reduced threaded stem 35 which passes through an opening in the sprocket rim and is provided with a nut 36 to clamp the rim against the shoulder, thus preventing the rim from having independent movement, so that it will turn positively at all times with the crank 2 and its hub. This mode of constructing and applying the sprocket wheel brings the same to lie just inside of the plane of the bearing balls 6, thus disposing the sprocket strain over and between the bearing points and eliminating the side pull usually produced.

It will be apparent from the foregoing description, taken in connection with the drawing, that the invention provides a construction which materially reduces the friction and strain upon the parts and produces a bearing which is stronger and more efficient than those of ordinary construction in which cones carried by a crank shaft are disposed within the hanger and coöperate with cups therein to form raceways for the bearing balls; also, that the improved sectional construction of the parts permits easy access to the bearing members and their more ready removal for cleaning and repairs.

Having thus described the invention, what is claimed as new, is:—

1. In a crank and crank shaft bearing, the combination of a crank hanger, independently adjustable bearing rings arranged therein, said rings having a sliding engagement at their inner ends permitting them to have independent longitudinal and rotative movement and being provided at their outer ends with bearing portions, cranks having coöperating bearing portions, bearing balls between said bearing portions, a crank shaft extending through the bearing members and comprising sections carried by said cranks, and means detachably connecting said crank sections.

2. In a crank and crank shaft bearing for bicycles, a hanger, a sleeve removably mounted in the hanger, said hanger and sleeve being formed with openings, independently adjustable bearing members carried by and removable with said sleeve, and locking devices projecting through the openings in the hanger and sleeve and engaging the bearing members to lock the same from movement, said locking devices being removable to permit of the insertion of a suitable tool to adjust said bearing members, substantially as described.

3. In a crank and crank shaft bearing, the combination of a crank hanger, independently adjustable bearing rings arranged therein, said rings having a sliding engagement at their inner ends permitting them to have independent longitudinal and rotative movement and being provided at their outer ends with bearing portions, cranks having coöperating bearing portions, bearing balls between said bearing portions, a crank shaft extending through the bearing members and comprising sections carried by said cranks, a bolt passing through the shaft sections and having a head at one end countersunk in one of the shaft sections and having its opposite end threaded, a securing nut engaging the other end of the bolt and countersunk in the other shaft section, and a lock nut engaging the latter named section and bearing against said securing nut.

4. In a crank and crank shaft bearing for bicycles, a hanger, a sleeve removably mounted in the hanger, said hanger and sleeve being formed with openings, right and left hand threaded bearing members disposed in the sleeve, and locking devices projecting through in the openings in the hanger and sleeve and engaging the bearing members to lock the same from movement, said devices being removable to permit of the insertion of a suitable tool through the openings to adjust said bearing members, substantially as described.

5. In a crank and crank shaft bearing for bicycles, a hanger, a sleeve removably mounted in the hanger and having internal right and left hand threads, means for locking the sleeve from withdrawal, bearing rings or cones disposed in the sleeve and respectively right and left hand threaded to engage said threaded portions of the sleeve, said rings having a telescopic engagement at their inner ends for independent adjustment and being provided at their outer ends with bearing portions projecting beyond the hanger, and means for locking said rings in adjusted position.

6. In a crank and crank shaft bearing for bicycles, the combination of a crank hanger, a holding sleeve arranged therein for longitudinal withdrawal therefrom, means for locking said sleeve against withdrawal, hollow bearing members or rings arranged within the sleeve and having a telescopic connection at their inner ends and provided with bearing portions at their outer ends projecting beyond the hanger, said rings being connected with the sleeve for independent adjustment and for insertion and withdrawal therefrom, cranks having coöperating bearing members, balls in the raceways formed by the sets of bearing members, a crank shaft comprising sections carried by the cranks and projecting through the bearing rings, said crank sections being interlocked at their inner ends to hold them from independent rotation, and a bolt passing through said crank sections and holding them from separation.

7. In a crank and crank shaft bearing for bicycles, a hanger, a bearing support mounted therein and removably secured thereto, adjustable bearing members fitted in said support and slidably and revolubly connected at their inner ends and having their outer ends projecting beyond the ends of the hanger, a crank shaft extending through said bearing members and composed of detachably connected sections, cranks carrying bearing members to coöperate with the outer ends of said adjustable bearing members, and bearing balls between the bearing surfaces of the sets of bearing members.

8. In a crank and crank shaft bearing, the combination of a crank hanger, a holding sleeve removably secured to the wall of the hanger, hollow bearing members adjustably mounted within and removable with said sleeve, said members being independently adjustable and having bearing surfaces projecting beyond the ends of the sleeve, cranks having coöperating bearing surfaces, bearing balls between said bearing surfaces, a crank shaft extending through the hollow bearing members and comprising sections carried by said cranks, and means detachably connecting said crank sections.

9. The combination of a hanger, a sleeve therein, bearings and cranks carried by the sleeve and a key intermediate the sleeve and hanger serving to lock the hanger in position.

10. The combination of a tubular hanger, a sleeve removably placed therein, bearings and cranks carried by the sleeve and a key sleeve arranged transversely to the axis of the cranks and intermediate the hanger and sleeve serving to prevent displacement of the sleeve.

In testimony whereof, I affix my signature in presence of two witnesses.

WILLIAM L. LOWRANCE.

Witnesses:
 JOHN T. BAYET,
 NEWTON W. TALLY.